(12) United States Patent
Chen et al.

(10) Patent No.: US 11,296,891 B2
(45) Date of Patent: Apr. 5, 2022

(54) MICROCODE SIGNATURE SECURITY MANAGEMENT SYSTEM BASED ON TRUSTZONE TECHNOLOGY AND METHOD

(71) Applicant: AMLOGIC (SHANGHAI) CO., LTD., Shanghai (CN)

(72) Inventors: Yanhong Chen, Shanghai (CN); Zhi Zhou, Shanghai (CN); Ting Yao, Shanghai (CN); Peifu Jiang, Shanghai (CN); Pengguang Zhu, Shanghai (CN); Qi Cao, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 659 days.

(21) Appl. No.: 16/324,145

(22) PCT Filed: Sep. 17, 2018

(86) PCT No.: PCT/CN2018/105980
§ 371 (c)(1),
(2) Date: Feb. 8, 2019

(87) PCT Pub. No.: WO2019/062577
PCT Pub. Date: Apr. 4, 2019

(65) Prior Publication Data
US 2021/0359861 A1    Nov. 18, 2021

(30) Foreign Application Priority Data
Sep. 27, 2017   (CN) .......................... 201710892977.2

(51) Int. Cl.
*H04L 29/06*     (2006.01)
*H04L 9/32*      (2006.01)

(52) U.S. Cl.
CPC ................................ *H04L 9/3247* (2013.01)

(58) Field of Classification Search
CPC ..................................................... H04L 9/3247
See application file for complete search history.

(56) References Cited

U.S. PATENT DOCUMENTS 9,367,692 B2 *   6/2016   Brown .................... G06F 21/71
9,491,111 B1 *   11/2016  Roth ..................... G06F 21/645
(Continued)

FOREIGN PATENT DOCUMENTS

CN       103136488 A      6/2013
CN       103136488 A      6/2013
(Continued)

OTHER PUBLICATIONS

PCT/CN2018/105980, Search Report and Written Opinion dated Nov. 22, 2018, 8 pages—Chinese, 7 pages—English.

*Primary Examiner* — Ghodrat Jamshidi
(74) *Attorney, Agent, or Firm* — Andrew F. Young; Nolte Lackenbach Siegel

(57) ABSTRACT

A microcode signature security management system based on a Trustzone technology comprises the steps of: starting a normal operating system; acquiring the signature-encrypted microcode file and outputting the signature-encrypted microcode file and a switching signal by the normal operating system; receiving the switching signal and starting the monitor mode by the microprocessor to start a secure operating system; receiving the signature-encrypted microcode file, performing signature verification on the signature-encrypted microcode file, loading the file when the signature verification passes, otherwise outputting microcode error information when the signature verification fails by the secure operating system. The security of microcode is ensured on the basis of a secure operating system safety environment to which a system layer is inaccessible. A cryptography tool measure is adopted, so that the security, integrity and correctness of loaded microcode are ensured, (Continued)

and the risk of breaking, modifying and replacing an existing microcode management mechanism is lowered.

20 Claims, 2 Drawing Sheets

(56) References Cited

U.S. PATENT DOCUMENTS

| | | | | |
|---|---|---|---|---|
| 10,079,681 | B1* | 9/2018 | Roth | G06F 21/629 |
| 2005/0144476 | A1* | 6/2005 | England | G06F 21/575 |
| | | | | 726/17 |
| 2006/0156008 | A1* | 7/2006 | Frank | G06F 21/57 |
| | | | | 713/181 |
| 2009/0217050 | A1 | 8/2009 | Amiel et al. | |
| 2009/0300298 | A1* | 12/2009 | Ash | G06F 12/0804 |
| | | | | 711/E12.001 |
| 2009/0300408 | A1* | 12/2009 | Ash | G06F 11/2092 |
| | | | | 714/5.11 |
| 2012/0216050 | A1* | 8/2012 | Barner | G06F 21/30 |
| | | | | 713/189 |
| 2013/0347058 | A1* | 12/2013 | Smith | G06F 21/57 |
| | | | | 726/1 |
| 2015/0143352 | A1* | 5/2015 | Tokumoto | G06F 21/572 |
| | | | | 717/169 |
| 2016/0070932 | A1* | 3/2016 | Zimmer | G06F 21/53 |
| | | | | 713/192 |
| 2017/0026181 | A1* | 1/2017 | Chhabra | H04L 9/3234 |
| 2017/0091458 | A1* | 3/2017 | Gupta | G06F 21/57 |
| 2018/0032733 | A1* | 2/2018 | Surdu | G06F 9/4881 |
| 2018/0365422 | A1* | 12/2018 | Callaghan | G06F 21/575 |
| 2019/0004788 | A1* | 1/2019 | Juliato | G06F 8/658 |

FOREIGN PATENT DOCUMENTS

| | | |
|---|---|---|
| CN | 104918116 A | 9/2015 |
| CN | 104918116 A | 9/2015 |
| CN | 105138930 A | 12/2015 |
| CN | 105138930 A | 12/2015 |
| CN | 107707981 A | 2/2018 |

* cited by examiner

MICROCODE SIGNATURE SECURITY MANAGEMENT SYSTEM BASED ON TRUSTZONE TECHNOLOGY AND METHOD

CROSS REFERENCE TO RELATED APPLICATIONS

This application relates to, and claims priority as a national phase application from Ser. No. PCT/CN2018/105980 filed Sep. 17, 2018, the entire contents of which are incorporated herein by reference, and which in turn claims priority to and benefit of Chinese Patent App. Ser. No. 201710892977.2 filed Sep. 27, 2017

Figure Selected for Publication
FIG. 1

BACKGROUND OF THE INVENTION

1. Field of the Invention

The invention relates to the technical field of data security storage, and more particularly, to a microcode signature security management system based on a Trustzone technology and a method.

2. Description of the Related Art

At present, embedded multimedia products generally comprises the hardware decoding function developed by chip manufacturers. The key of hardware decoding is whether the corresponding microcode can be successfully loaded during video playback to decode the video correctly. Since the microcode is the core technology of the video decoding, the correctness of microcode itself is of great importance to the video decoding. Now, the microcode loading management mechanism of the manufacturer is compiling the microcode into the platform firmware system in the form of code data segments, or storing the microcode in a directory of the platform firmware system in the form of binary files, so as to search for the microcode according to a preset firmware storage path, and to load and run the microcode during the video playback.

The existing microcode management mechanism can generally satisfy the function of being successfully loaded and utilized during playback. However, both of the above forms are at risk of being damaged and modified, and the microcode stored in the system directory in the form of binary files is also at a risk of being replaced. Any detection protection methods, regarding the risks of being damaged and modified or replaced, are not incorporated into the management mechanism.

SUMMARY OF THE INVENTION

Given that the foregoing problems exist in the prior art, the present invention provides a microcode signature security management system based on a Trustzone technology and method. Detail technical solutions are as follows:

A microcode signature security management system based on a Trustzone technology, applicable to a hardware equipment including a microprocessor based on Trustzone technology, wherein a signature-encrypted microcode file is pre-stored in the hardware equipment, the microprocessor has a physical core divided into a virtual secure core and a virtual normal core, and the microprocessor provides a secure execution environment which provides a secure operating system based on the secure core, and a normal execution environment which provides a normal operating system based on the normal core, and the microprocessor switches between the secure operating system and the normal operating system depending on monitor mode of the microprocessor; wherein:

starting the normal operating system after the hardware equipment is started; acquiring the signature-encrypted microcode file and outputting the signature-encrypted microcode file and a switching signal by the normal operating system; receiving the switching signal and starting the monitor mode by the microprocessor to start the secure operating system; receiving the signature-encrypted microcode file, performing signature verification on the signature-encrypted microcode file, loading the file when the signature verification passes, otherwise outputting microcode error information when the signature verification fails by the secure operating system.

Preferably, the hardware equipment comprises:

a storage module, configured to store the signature-encrypted microcode file; and a signature-encrypted module, connected to the storage module, and configured to obtain the microcode file and perform signature encryption on the microcode file, and configured to output the signature-encrypted microcode file.

Preferably, the normal operating system comprises:

a client application module, connected to the signature-encrypted module, and configured to receive the signature-encrypted microcode file, and configured to output the signature-encrypted microcode file and the switching signal.

Preferably, the hardware equipment further comprises:

a monitor mode module, connected to the client application module, and configured to receive the switching signal and switch the microprocessor to the secure operating system.

Preferably, the secure operating system comprises:

an application end module, connected to the client application module, and configured to receive the signature-encrypted microcode file, perform signature verification on the signature-encrypted microcode file, load the microcode file when the signature verification passes, and output microcode error information when the signature verification fails.

A microcode signature security management method based on a Trustzone technology using the above-mentioned microcode signature security management system, the method comprising:

Step S1, starting a normal operating system after the hardware equipment is started;

Step S2, acquiring the signature-encrypted microcode file and outputting the signature-encrypted microcode file and the switching signal by the normal operating system;

Step S3, receiving the switching signal and starting the monitor mode by the microprocessor in order to start the secure operating system;

Step S4, the secure operating system receiving the signature-encrypted microcode file, performing signature verification on the signature-encrypted microcode file, and determining whether the signature verification passes or not by the secure operating system:

if the result shows "YES", the secure operating system loads the microcode file;

if the result shows "NO", the secure operating system outputs the microcode error information.

Preferably, in Step S2, the normal operating system acquires the signature-encrypted microcode file via the client application module, and outputs the signature-encrypted microcode file and the switching signal.

Preferably, in Step S3, the microprocessor receives the switching signal via the monitor mode module, and starts the monitor mode so as to start the secure operating system.

Preferably, in Step S4, the secure operating system receives the signature-encrypted microcode file via the application end module, performs signature verification on the signature-encrypted microcode file, and determines whether the signature verification passes or not.

The present invention has beneficial effects that the security of microcode is ensured on the basis of a secure operating system (secure os) safety environment to which a system layer is inaccessible. A cryptography tool measure is adopted, so that the security, integrity and correctness of loaded microcode are ensured, and the risk of breaking, modifying and replacing an existing microcode management mechanism is lowered.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
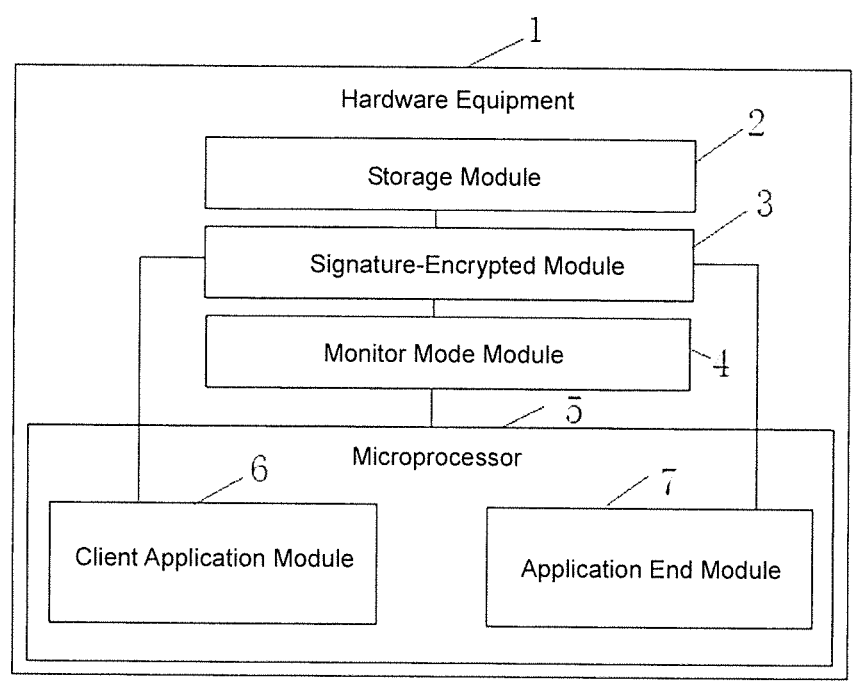
FIG. 1 is a schematic diagram of functional modules of a microcode signature security management system based on Trustzone technology in a preferred embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of common skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, certain exemplary embodiments according to the present disclosure will be described with reference to the accompanying drawings.

As shown in FIG. 1, a microcode signature security management system based on a Trustzone technology, applicable to a hardware equipment including a microprocessor based on Trustzone technology, wherein a signature-encrypted microcode file is pre-stored in the hardware equipment 1, the microprocessor 5 has a physical core divided into a virtual secure core and a virtual normal core, and the microprocessor 5 provides a secure execution environment which provides a secure operating system based on the secure core, and a normal execution environment which provides a normal operating system based on the normal core, and the microprocessor 5 switches between the secure operating system and the normal operating system depending on monitor mode of the microprocessor; and wherein:

starting the normal operating system after the hardware equipment 1 is started; acquiring the signature-encrypted microcode file and outputting the signature-encrypted microcode file and a switching signal by the normal operating system; receiving the switching signal and starting the monitor mode by the microprocessor 5 to start the secure operating system; receiving the signature-encrypted microcode file, performing signature verification on the signature-encrypted microcode file, loading the file when the signature verification passes, otherwise outputting microcode error information when the signature verification fails by the secure operating system.

In a preferred embodiment, the hardware equipment 1 comprises:

a storage module 2, configured to store the signature-encrypted microcode file; and a signature-encrypted module 3, connected to the storage module 2, and configured to obtain the microcode file and perform signature encryption on the microcode file, and configured to output the signature-encrypted microcode file.

In a preferred embodiment, the normal operating system comprises:

a client application module 6, connected to the signature-encrypted module 3, and configured to receive the signature-encrypted microcode file, and configured to output the signature-encrypted microcode file and the switching signal.

In a preferred embodiment, the hardware equipment 1 further comprises: a monitor mode module 4, connected to the client application module 6, and configured to receive the switching signal and switch the microprocessor 5 to the secure operating system.

In a preferred embodiment, the secure operating system comprises:

an application end module 7, connected to the client application module 6, and configured to receive the signature-encrypted microcode file, perform signature verification on the signature-encrypted microcode file, load the microcode file when the signature verification passes, and output microcode error information when the signature verification fails.

In this embodiment, the present invention provides the microprocessor 5 supporting Trustzone technology, the microprocessor 5 is required for the security management mechanism of a hardware. In the microprocessor, Trustzone technology virtualizes each of the physical cores of the processor into a secure core and an normal core, and divides the system into a normal domain (corresponding to the normal operating system) and a secure domain (corresponding to the secure operating system). The normal operating system is inaccessible to obtain resource data from the secure operating system.

When the operating system of the microprocessor is switched from the normal operating system to the secure operating system, the monitor mode provided by the ARM Trustzone is needed. A user sends FIQ (Fast Interrupt Request) through the normal operating system to enter the monitor mode, and NS bit in Secure Configuration Register (SCR) of the ARM processor (microprocessor 5) is set to 0 under the above-mentioned monitor mode, such that the ARM processor state is switched to the secure operating system.

In the secure environment of the secure operating system, a PC tool (the hardware equipment 1) performs signature encryption on a microcode file, and the signature-encrypted microcode file is stored in a fixed path of the hardware equipment 1. The microcode signature security management system is turned on to start the client application module 6, which is referred to CA, and the client end process sends the signature-encrypted microcode file to the trusted application end module, which is referred to TA.

The application end module 7 performs signature verification on the signature-encrypted microcode file, and loads the microcode file if the verification passes, otherwise the application end module 7 gives a feedback of microcode error information and not preloads the microcode file.

The system performs digital signature encryption on the microcode file and performs signature verification in the secure operating system, which effectively ensures the security, integrity and correctness of the microcode file to be loaded.

In the microcode loaded management mechanism of the system, the security of microcode is ensured on the basis of a secure operating system (secure os) safety environment to which a system layer is inaccessible. A cryptography tool measure is adopted, so that the correctness of loaded microcode is ensured. On one hand, the integrity of the microcode is ensured using the cryptographic digital signature algorithm, on the other hand, the security of performing signature verification on the microcode is ensured based on the secure os trustzone secure system. The introduction of such a mechanism can greatly avoid the issue of video decoding malfunction resulting from the damage, modification and replacement of the microcode, which brings convenience to the video decoding support staff.

Figure 2:
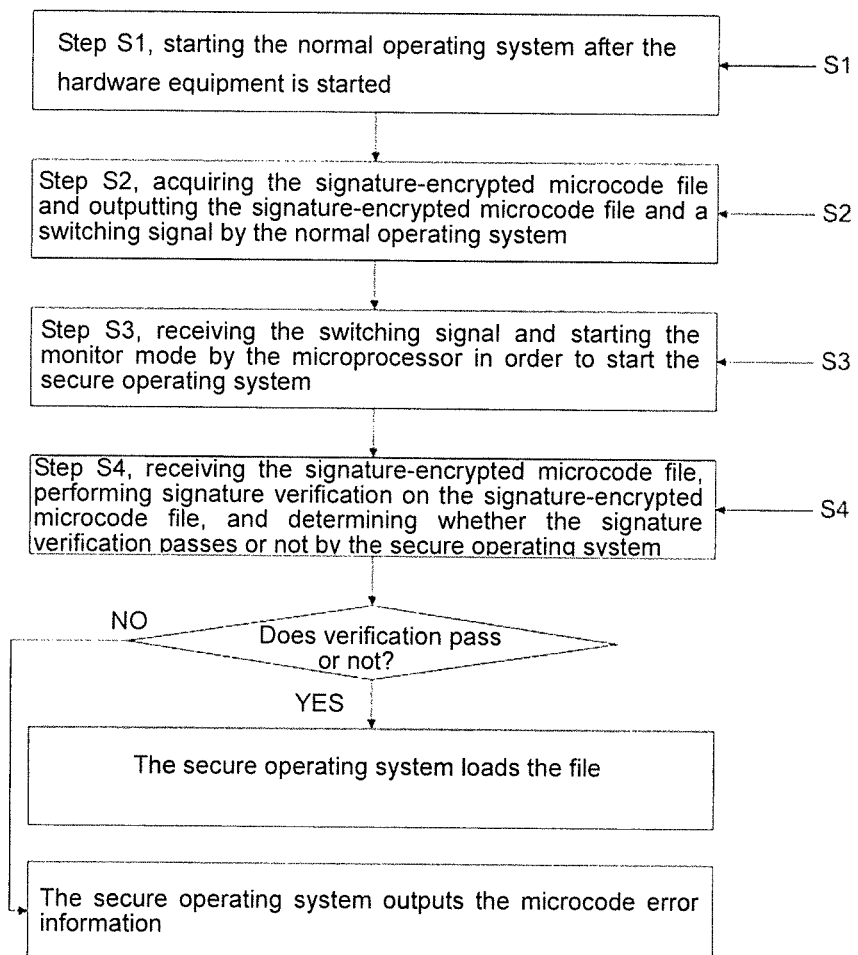
FIG. 2 is a flowchart of a microcode signature security management method based on Trustzone technology in a preferred embodiment of the present invention.

As shown in FIG. 2, a microcode signature security management method based on a Trustzone technology using the above-mentioned microcode signature security management system, the method comprising the steps of:

Step S1, starting a normal operating system after the hardware equipment 1 is started;

Step S2, acquiring the signature-encrypted microcode file and outputting the signature-encrypted microcode file and the switching signal by the ordinary operating system;

Step S3, receiving the switching signal and starting the monitoring mode by the microprocessor 5 in order to start the secure operating system;

Step S4, receiving the signature-encrypted microcode file, performing signature verification on the signature-encrypted microcode file, and determining whether the signature verification passes or not by the secure operating system:

if the result shows "YES", the secure operating system loads the microcode file;

if the result shows "NO", the secure operating system outputs the microcode error information.

In a preferred embodiment, in Step S2, the ordinary operating system acquires the signature-encrypted microcode file via the client application module 6, and outputs the signature-encrypted microcode file and the switching signal.

In a preferred embodiment, in Step S3, the microprocessor 5 receives the switching signal via the monitor mode module 4, and starts the monitor mode so as to start the secure operating system.

In a preferred embodiment, in Step S4, the secure operating system receives the signature-encrypted microcode file via the application end module 7, performs signature verification on the signature-encrypted microcode file, and determines whether the signature verification passes or not.

In this embodiment, the hardware equipment 1 performs a digital signature encryption on the microcode in the form of a binary file in advance, the hardware equipment 1 is started to run the CA module, and the TA module receives the integrity and correctness of the verification microcode.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. A microcode signature security management system based on a Trustzone technology, comprising: applicable to a hardware equipment including a microprocessor based on Trustzone technology, wherein a signature-encrypted microcode file is pre-stored in the hardware equipment, the microprocessor has a physical core divided into a virtual secure core and a virtual normal core, and the microprocessor provides a secure execution environment which provides a secure operating system based on the virtual secure core, and a normal execution environment which provides a normal operating system based on the normal core, and the microprocessor switches between the secure operating system and the normal operating system depending on monitor mode of the microprocessor; wherein:

starting the normal operating system after the hardware equipment is started; acquiring the signature-encrypted microcode file and outputting the signature-encrypted microcode file and a switching signal by the normal operating system; receiving the switching signal and starting the monitor mode by the microprocessor to start the secure operating system; receiving the signature-encrypted microcode file, performing signature verification on the signature-encrypted microcode file, loading the file when the signature verification passes, otherwise outputting microcode error information when the signature verification fails by the secure operation system.

2. The microcode signature security management system as claimed in claim 1, wherein the hardware equipment comprises:

a storage module, configured to store the signature-encrypted microcode file; and a software signature-encrypted module, connected to the storage module, and configured to obtain the microcode file and perform signature encryption on the microcode file, and configured to output the signature-encrypted microcode file.

3. The microcode signature security management system as claimed in claim wherein the normal operating system comprises:

a client application module, connected to the signature-encrypted module, and configured to receive the signature-encrypted microcode file, and configured to output the signature-encrypted microcode file and the switching signal.

4. The microcode signature security management system as claimed in claim 3, wherein the hardware equipment further comprises:
a monitor mode module, connected to the client application module, and configured to receive the switching signal and switch the microprocessor to the secure operating system.

5. The microcode signature security management system as claimed in claim 4, wherein the secure operating system comprises:
an application end module, connected to the client application module, and configured to receive the signature-encrypted microcode file, perform signature verification on the signature-encrypted microcode file, load the microcode file when the signature verification passes, and output microcode error information when the signature verification fails.

6. A microcode signature security management method based on a Trustzone technology using a microcode signature security management system based on the Trustzone technology applicable to a hardware equipment including a microprocessor based on Trustzone technology, comprising: wherein a signature-encrypted microcode file is pre-stored in the hardware equipment, the microprocessor has a physical core divided into a virtual secure core and a virtual normal core, and the microprocessor provides a secure execution environment which provides a secure operating system based on the virtual secure core, and a normal execution environment which provides a normal operating system based on the normal core, and the microprocessor switches between the secure operating system and the normal operating system depending on monitor mode of the microprocessor; wherein:
starting the normal operating system after the hardware equipment is started; acquiring the signature-encrypted microcode file and outputting the signature-encrypted microcode file and a switching signal by the normal operating system; receiving the switching signal and starting the monitor mode by the microprocessor to start the secure operating system; receiving the signature-encrypted microcode file, performing signature verification on the signature-encrypted microcode file, loading the file when the signature verification passes, otherwise outputting microcode error information when the signature verification fails by the secure operation system;
the method comprising:
Step S1, starting a normal operating system after the hardware equipment is started;
Step S2, acquiring the signature-encrypted microcode file and outputting the signature-encrypted microcode file and the switching signal by the normal operating system;
Step S3, receiving the switching signal and starting the monitor mode by the microprocessor in order to start the secure operating system;
Step S4, receiving the signature-encrypted microcode file, performing signature verification on the signature-encrypted microcode file, and determining whether the signature verification passes or not by the secure operating system:
if the result shows "YES", the secure operating system loads the microcode file;
if the result shows "NO", the secure operating system outputs the microcode error information.

7. The microcode signature security management method as claimed in claim 6, wherein the hardware equipment comprises:
a storage module, configured to store the signature-encrypted microcode file; and
a signature-encrypted module, connected to the storage module, and configured to obtain the microcode file and perform signature encryption on the microcode file, and configured to output the signature-encrypted microcode file.

8. The microcode signature security management method as claimed in claim 7, wherein the normal operating system comprises:
a client application module, connected to the signature-encrypted module, and configured to receive the signature-encrypted microcode file, and configured to output the signature-encrypted microcode file and the switching signal.

9. The microcode signature security management method as claimed in claim 7, wherein in Step S2, the normal operating system acquires the signature-encrypted microcode file via the client application module, and outputs the signature-encrypted microcode file and the switching signal.

10. The microcode signature security management method as claimed in claim 7, wherein in Step S3, the microprocessor receives the switching signal via the monitor mode module, and starts the monitor mode so as to start the secure operating system.

11. The microcode signature security management method as claimed in claim 8, wherein the hardware equipment further comprises:
a monitor mode module, connected to the client application module, and configured to receive the switching signal and switch the microprocessor to the secure operating system.

12. The microcode signature security management method as claimed in claim 8, wherein in Step S2, the normal operating system acquires the signature-encrypted microcode file via the client application module, and outputs the signature-encrypted microcode file and the switching signal.

13. The microcode signature security management method as claimed in claim 8, wherein in Step S3, the microprocessor receives the switching signal via the monitor mode module, and starts the monitor mode so as to start the secure operating system.

14. The microcode signature security management method as claimed in claim 11, wherein the secure operating system comprises:
an application end module, connected to the client application module, and configured to receive the signature-encrypted microcode file, perform signature verification on the signature-encrypted microcode file, load the microcode file when the signature verification passes, and output microcode error information when the signature verification fails.

15. The microcode signature security management method as claimed in claim 11, wherein in Step S2, the normal operating system acquires the signature-encrypted microcode file via the client application module, and outputs the signature-encrypted microcode file and the switching signal.

16. The microcode signature security management method as claimed in claim 11, wherein in Step S3, the microprocessor receives the switching signal via the monitor mode module, and starts the monitor mode so as to start the secure operating system.

17. The microcode signature security management method as claimed in claim 14, wherein in Step S2, the normal operating system acquires the signature-encrypted microcode file via the client application module, and outputs the signature-encrypted microcode file and the switching signal.

18. The microcode signature security management method as claimed in claim 6, wherein in Step S2, the normal operating system acquires the signature-encrypted microcode file via the client application module, and outputs the signature-encrypted microcode file and the switching signal.

19. The microcode signature security management method as claimed in claim 6, wherein in Step S3, the microprocessor receives the switching signal via the monitor mode module, and starts the monitor mode so as to start the secure operating system.

20. The microcode signature security management method as claimed in claim 6, wherein in Step S4, the secure operating system receives the signature-encrypted microcode file via the application end module, performs signature verification on the signature-encrypted microcode file, and determines whether the signature verification passes or not.

* * * * *